(12) United States Patent
Illuminati et al.

(10) Patent No.: US 11,186,365 B2
(45) Date of Patent: Nov. 30, 2021

(54) FLYING SERVICE EQUIPMENT

(71) Applicant: BENTEL SECURITY S.R.L., Corropoli (IT)

(72) Inventors: Paolo Illuminati, Cupramarittima (IT); Gianfranco Locantore, Rome (IT)

(73) Assignee: BENTEL SECURITY S.R.L., Corropoli (IT)

( * ) Notice: Subject to any disclaimer, the term of this patent is extended or adjusted under 35 U.S.C. 154(b) by 497 days.

(21) Appl. No.: 15/968,534

(22) Filed: May 1, 2018

(65) Prior Publication Data

US 2018/0312255 A1 Nov. 1, 2018

Related U.S. Application Data

(60) Provisional application No. 62/492,399, filed on May 1, 2017.

(51) Int. Cl.
| | |
|---|---|
| *B64C 39/02* | (2006.01) |
| *G08B 29/14* | (2006.01) |
| *G08B 29/12* | (2006.01) |
| *B64D 1/02* | (2006.01) |

(52) U.S. Cl.
CPC .............. *B64C 39/024* (2013.01); *B64D 1/02* (2013.01); *G08B 29/12* (2013.01); *G08B 29/145* (2013.01); *B64C 2201/027* (2013.01); *B64C 2201/042* (2013.01); *B64C 2201/108* (2013.01); *B64C 2201/12* (2013.01); *B64C 2201/126* (2013.01); *B64C 2201/141* (2013.01); *B64C 2201/146* (2013.01)

(58) Field of Classification Search
CPC .............. B64C 39/024; B64C 2201/14; B64C 2201/108; B64D 1/00; G08B 29/12; G08B 29/00; G08B 29/145; G08B 13/19682; G08B 17/10; G08B 17/12; G08B 25/14; G08B 25/014; G08B 29/14; G08B 29/20; G01T 7/12; G05B 23/00
See application file for complete search history.

(56) References Cited

U.S. PATENT DOCUMENTS

| | | | |
|---|---|---|---|
| 6,362,875 B1 * | 3/2002 | Burkley | G01S 5/163 356/139.03 |
| 10,384,804 B2 * | 8/2019 | Priest | B64C 39/024 |
| 10,535,103 B1 * | 1/2020 | Tofte | G06T 11/60 |

(Continued)

FOREIGN PATENT DOCUMENTS

JP 2018008647 A * 1/2018

OTHER PUBLICATIONS

Mike Lohr, "Fire Alarm System Testing, Inspection and Maintenance", Jun. 1, 2002, EC&M (Year: 2002).*

*Primary Examiner* — Christian Chace
*Assistant Examiner* — Benjamin Fang
(74) *Attorney, Agent, or Firm* — Arent Fox LLP

(57) ABSTRACT

A service system and method using flying service equipment are disclosed. In the service system, flying service equipment such as a drone can be remotely piloted by an operator to perform activities such as installing, configuring, and testing distributed devices such as fire detection devices in a fire alarm system. The service system performs these activities upon distributed devices of a building management system. For this purpose, the service system includes a drone, and a service payload carried by the drone for performing the activities on the distributed devices.

20 Claims, 6 Drawing Sheets

(56) References Cited

U.S. PATENT DOCUMENTS

| | | | |
|---|---|---|---|
| 10,689,107 B2* | 6/2020 | Baracaldo Angel | F16M 13/027 |
| 2015/0246727 A1* | 9/2015 | Masticola | B64C 39/024 701/2 |
| 2015/0310732 A1* | 10/2015 | Piccolo, III | G08B 29/145 340/515 |
| 2019/0233106 A1* | 8/2019 | Penney | B64C 39/024 |

* cited by examiner

FLYING SERVICE EQUIPMENT

RELATED APPLICATIONS

This application claims the benefit under 35 USC 119(e) of U.S. Provisional Application No. 62/492,399, filed on May 1, 2017, which is incorporated herein by reference in its entirety.

BACKGROUND OF THE INVENTION

Fire alarm systems are often installed within commercial, residential, educational, or governmental buildings, to list a few examples. These fire alarm systems typically include control panels that function as system controllers and distributed devices such as fire detection devices, which monitor the buildings for indicators of fire (e.g., smoke, fire, rises in temperature). In one example, the fire detection devices are individually addressable smoke detectors that are part of a networked fire alarm system. Other examples of fire detection devices include carbon monoxide detectors, flame detectors, temperature sensors, and/or pull stations (also known as manual call points), fire notification user interface elements such as speakers, horns, bells, chimes, light emitting diode (LED) reader boards, and/or flashing lights (e.g., strobes), and actuators such as fire suppression systems. Upon detection of an indicator of fire such as smoke or heat or flames, the fire detection devices send event data to the control panel, which analyzes the received event data and generates an alarm if smoke is detected by one or more of the smoke detectors. Additionally, the fire control panel will also send an alarm signal to a monitoring station, which will notify the local fire department or fire brigade.

In another example, the fire alarm system is comprised of standalone or independent fire detection devices. This type of system is often implemented in residential buildings where there is a smaller area to monitor and building code requirements are more lenient. While each detector operates independently from the other detectors of the system, the detectors are often interconnected such that if one detector is activated into an alarm state, then all of the detectors enter the alarm state, A fire alarm system is an example of a building management system.

There are other examples of building management systems such as building automation systems, and security systems. Each of these systems, as with fire alarm systems, have their own versions of distributed devices. In general, these building management systems include one or more control panels or controllers connected to distributed devices positioned throughout the building. The distributed devices generally include combinations of sensors, user interfaces, and actuators. The sensors detect conditions throughout the premises and send data or analog signals to the control panels indicating the conditions. User interfaces display information and receive input from users of the systems. Actuators perform physical operations to control the environment of the premises.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized shades, and other mechanical equipment, to list a few examples.

Security systems typically include intrusion control panels and their own distributed devices. The distributed devices detect indications of intrusions, building security breaches and unauthorized access at or within the building and report to the intrusion panels. Security distributed devices include sensors such as motion sensors, door and window relays, and thermal sensors that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Two common types of fire detection devices are photoelectric (or optical) smoke detectors and ionization smoke detectors. The optical smoke detectors generally include a baffle system, which defines a detection chamber. The baffle system blocks ambient light from an ambient environment while also allowing air or smoke to flow into the detection chamber. A smoke detection system within the detection chamber detects the presence of smoke. Typically, the smoke detection system includes a chamber light source and a scattered light photodetector. When smoke fills the detection chamber it causes the light from the chamber light source to be scattered within the chamber and detected by the scattered light photodetector.

Once a predefined amount of light is received by the scattered light photodetector, an alarm condition is generated. The ionization smoke detectors also typically have a detection chamber containing an ionizing radioisotope to ionize the air in the detection chamber. When smoke fills the detection chamber, the electronics of the smoke detector detect a change caused by the ionization of the smoke. In response to the change in current, an alarm condition is generated. While ionization smoke detectors also include a baffle system to protect the detection chamber, the baffle system is typically designed to prevent moisture from entering the detection chamber because it can affect the accuracy of the smoke detector.

During installation, the fire detection devices are typically installed in a ceiling and are then connected to a wired loop. The wired loop provides a communications medium with the control panel. The wired loop is also known as a signaling line circuit.

Currently, building codes often require that the smoke detectors be tested annually. This annual testing is performed because smoke detectors have a number of different failure points. For example, the electronics and/or optics of the detector can fail. Alternatively, the baffle systems can become dirty and clogged over time. Additionally, it is not uncommon for the smoke detectors to be painted over or for insects or spiders to build nests or webs in the detectors.

The annual testing is commonly completed by a technician performing a walkthrough test. The technician walks through the building and manually tests each of the detectors of the fire alarm system. Typically, the technician uses a special testing device. In one example, the testing device includes an artificial smoke generating apparatus housed within a hood at the end of a pole. The technician places the hood around the fire detection device and the artificial smoke generating device releases artificial smoke near the detector. If the smoke detector is functioning properly, it will trigger in response to the artificial smoke. The technician repeats this process for every smoke detector of the fire alarm system.

SUMMARY OF THE INVENTION

Generally, fire detection device installation and service tasks are risky, expensive and time-consuming processes. They are risky because they require usage of ladders or other (sometimes more acrobatic) means to enable operators to reach the fire detection devices, which are normally fitted on ceilings. In some cases, the ceilings are very high. Furthermore, the use of a testing device fitted on a pole may result in an uncomfortable and tiring activity, mainly for the operator's back and neck.

Similar issues arise when performing activities on distributed devices of the other building managements systems. These devices can be located where access to them is difficult and possible dangerous.

The present invention concerns a service system (service system) that performs activities upon distributed devices of building management systems. It can be remote controlled or partially or fully autonomous. The activities cover activities of service including installation, testing, configuration and maintenance of the distributed devices. The service system allows the execution of these activities upon the distributed devices while allowing the operator to remain at floor level (no more ladders). In some cases, the activities can be performed even without an attentive operator. As a result, the operator, if present, can carry out activities of service upon distributed devices in relative comfort, in contrast to using existing testing devices mounted to ends of poles.

In one example, the service system is used to perform activities upon fire detection devices in a fire alarm system as an example of a building management system, where the fire detection devices are the distributed devices in the fire alarm system.

For this purpose, the service system includes a remotely controlled unmanned aerial vehicle (UAV) with the ability to execute stationary flight (e.g. a quad-copter), also referred to as a "drone". The drone carries a service payload which the drone attaches to a service base (and thus to the fire detection devices). The service payload includes a suite of tools also known as service tools.

When the drone and its service payload are used to service fire detection devices in a fire alarm system, in one example, the service payload is capable of performing at least the following activities:

fire detection device testing (against Smoke, Carbon Monoxide, Heat, Light, etc. fire detection devices);

fire detection device placement/removal on/from the service base; and fire detection device cleaning, such as when the device is a smoke detector.

Further, the fire detection devices are modified for compatibility with the drone. In one example, a new detector base for the fire detection devices is provided, or service base. The service base is used to allow safe drone standing/ hovering near the service base, approach/detach maneuvers, and to support various data communication links. The service base enables the drone and its payload to land upon the service base.

In general, according to one aspect, the invention features a service system for distributed devices of a building management system. It comprises a drone and a service payload carried by the drone for performing activities on the distributed devices.

There can be an equipment remote controller for controlling the drone and its service payload. Further, the service payload might include service tools for performing activities of service upon the distributed devices.

Often, the activities of service include installation, testing, configuration, and maintenance of the distributed devices. Specifically, the system can be used to test fire detection devices.

in one operational mode, the drone attaches the service payload to the service base, and detaches the service payload from the drone. To execute this, the service base can include alignment fiducials that enable alignment of the drone with the service base.

The service payload includes service tools that might include one or more of the following: anchoring tools for connecting the service payload to anchor points of the service base, a smoke generator that generates smoke and/or a smoke equivalent, a hood that is placed upon a surface of a fire detection device as the distributed device, and delivers the smoke and/or smoke equivalent to the fire detection device, and/or a cleaning tool for cleaning the fire detection device.

In general, according to another aspect, the invention features a method for performing activities on distributed devices of a building management system. This method comprises carrying a service payload using a drone to the distributed devices and performing activities on the distributed devices with the service payload.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
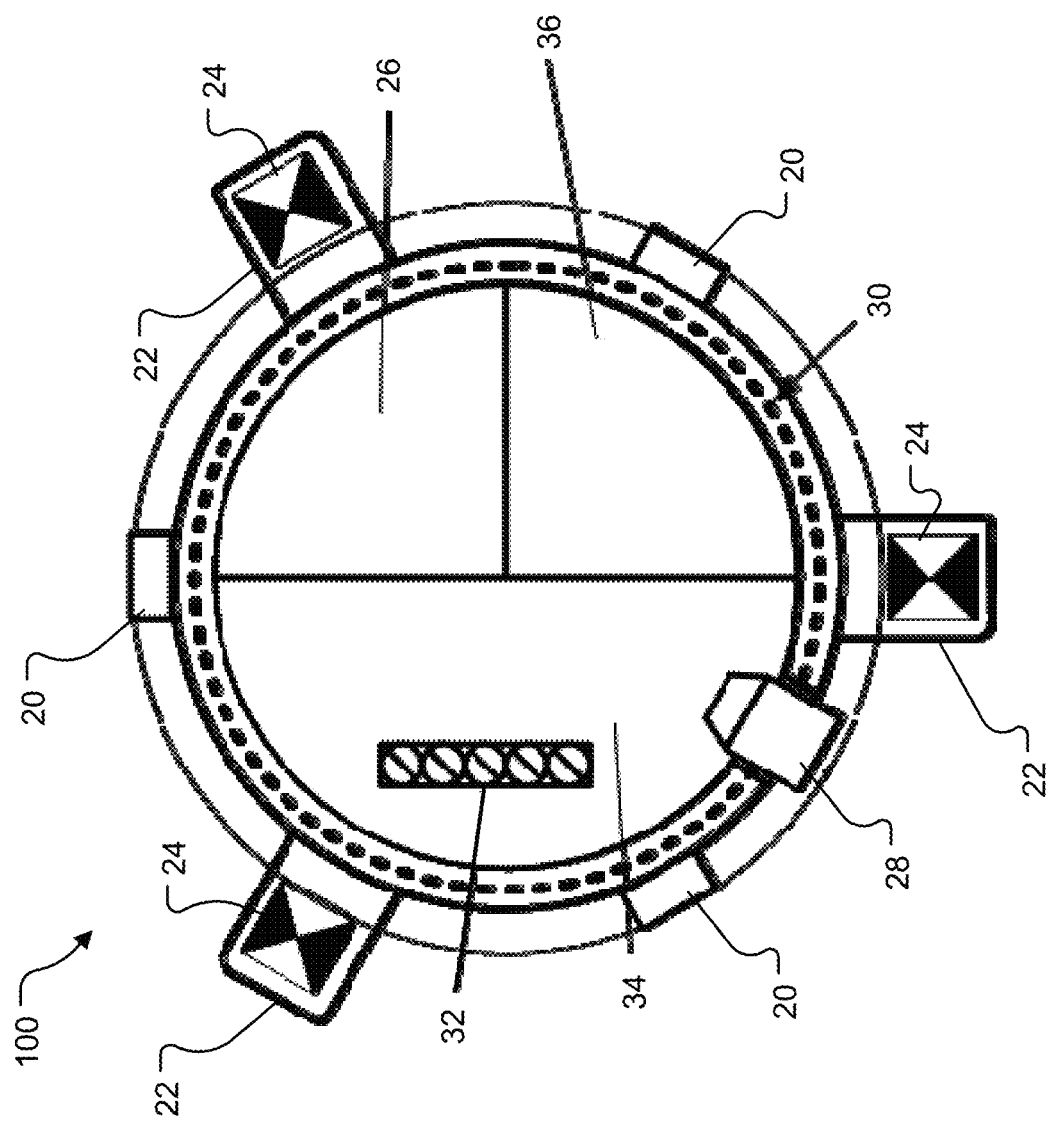
FIG. 1 is s a schematic diagram of a service base of the proposed service system, where the service base connects to a distributed device in a remote location, such as to a fire detection device mounted to a ceiling, and where the service base also connects individual fire detection devices to a Signaling Line Circuit of a fire detection system.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The drone and its service payload used in the present service system is able to automatically approach and hook to the service base of the fire detection device, which is especially designed for this purpose. Once the drone has been manually piloted in the proximity of the distributed device (e.g. fire detection device) to be installed, tested configured or otherwise serviced, the drone approaches the base and attaches the service payload to the base.

At this point, in some embodiments, the service payload detaches from the drone. Thus, the service payload remains anchored to the service base. The drone can then fly away and is available to carry another service payload to another fire detection device.

However, in other embodiments, the drone remains connected to the service payload, which is anchored to the service base.

In one exemplary mode of operation, the service payload then places or removes the fire detection device to/from its Smart Detector Base, (Installation or Maintenance activities).

During these maneuvers and subsequent operations, the service payload maintains a data link with the equipment radio controller, allowing the operator the full control of the test process (Test activity).

The service payload can also create a data path between the fire detection device, smart detector base, and the equipment radio controller in order to configure the fire detection device (Configuration/Commissioning activity).

Furthermore, when the service system is used to service fire detection devices in a fire detection system, the service payload also creates a "data Bridge" between a Fire Alarm Control Panel (accessed via service base resources and the Signaling Line Circuit) and the equipment radio controller, allowing the operator to make remote interaction with and to test the Fire Alarm Control Panel.

When the drone is connected to the service payload, the service payload can automatically detach itself from the service base. The drone with the service payload then maintains stationary flight at safe height (e.g. some feet below the ceiling) until the operator takes the control for landing or directs the drone to move to the next fire detection device, in examples.

The drone manages automatically critical situations such as (but not limited to):

After an automatic detach from the service base, and if the operator fails to take control within a pre-defined period, the drone will automatically perform a new approaching maneuver to attach onto the same service base followed by an automatic communication to Fire Alarm Control Panel.

In the case of loss of flying capability, revealed by autonomous detectors, a protective means will be deployed to limit injuries to site occupants and the drone itself.

The equipment Controller will check all the equipment resources (mainly the Drone and payload batteries charge level) to assess the next activity before it begins. Data about the activity requirements, in terms of resources, will be calculated using information stored in a system data logger.

During initial fire detection device installation, a testing of Signaling Line Circuit wiring is preferably executed at each service base by the service payload. This ensures early discovery of issues that normally are found, all together, at the first panel power-up generating a potential heavy troubleshooting activity.

The communication ability of the drone is particularly useful during maintenance and system troubleshooting. This supplies the operator the maximum possible support during critical situations.

Figure 2:
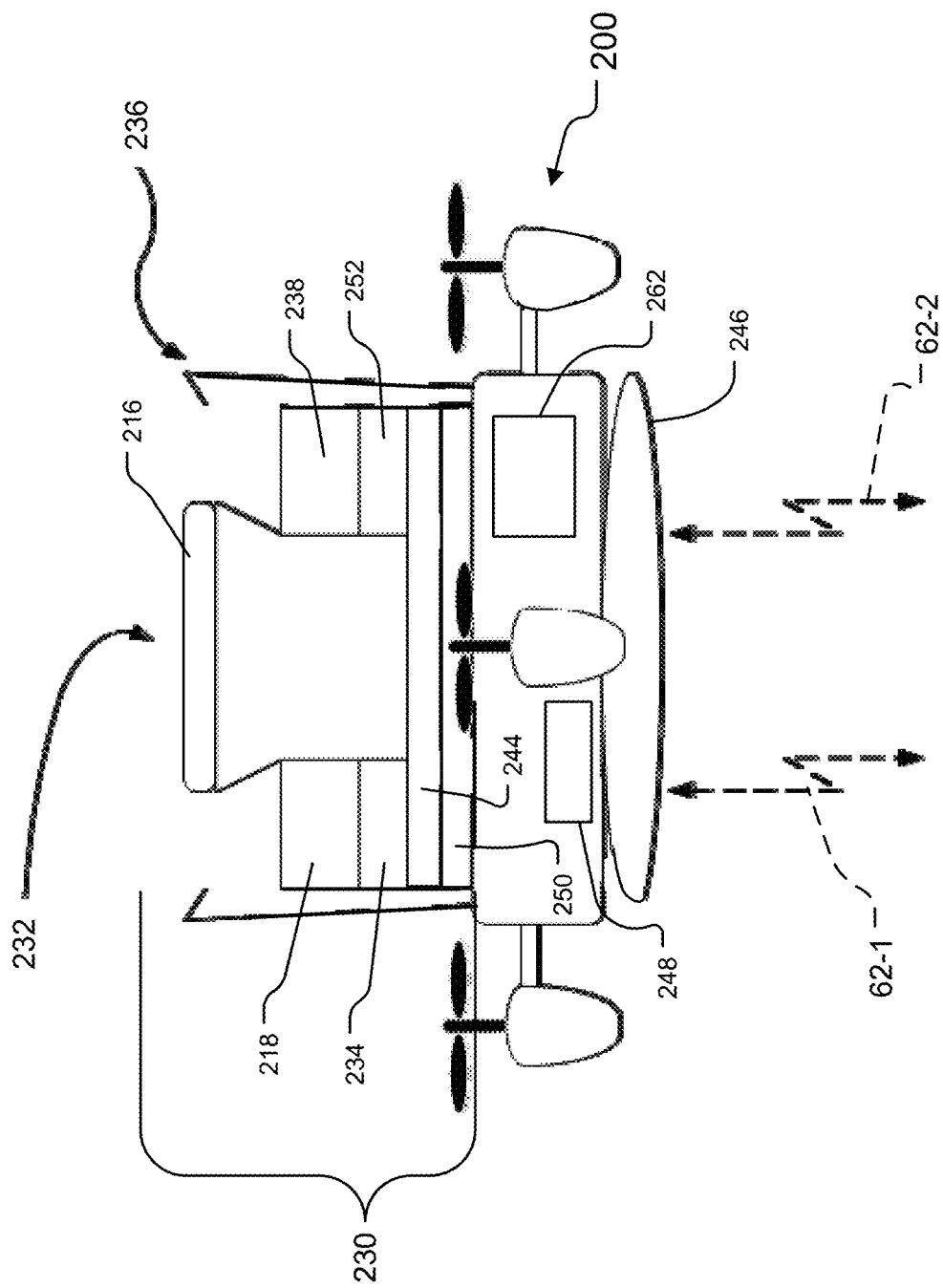
FIG. 2 is a schematic diagram of a drone of the service system carrying a service payload, where the service payload includes tools for performing service-related activities upon fire detection devices, in one example.
Figure 3:
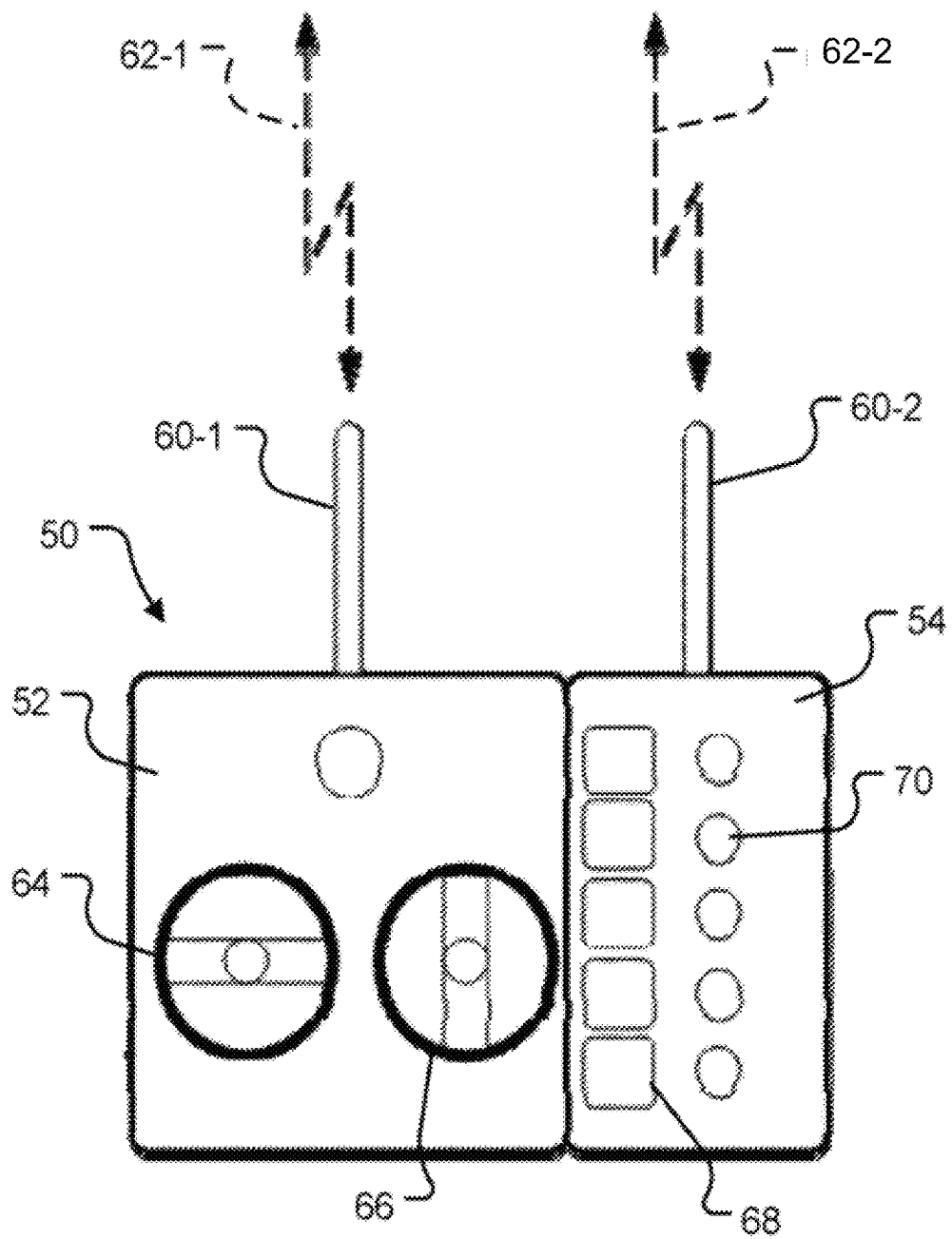
FIG. 3 is a schematic diagram of an equipment remote controller of the remote service system for controlling the drone and its service payload.

The proposed service system includes four main parts:

The service base, shown in FIG. 1 which connects the Fire detectors to the Signaling Line Circuit;

The flying service equipment ("drone") and its service payload, the latter of which includes tools required to execute various testing and configuration activities, where the drone carries service payload(s) from one fire detection device to another one, shown in FIG. 2; and The equipment remote controller, shown in FIG. 3, to control the entire remote controlled service system.

FIG. 1 shows a service base 100 of the service system. Here, the service base 100 enables installation and testing of a fire detection device as an example of a distributed device.

The service base 100 includes various components and features. These components and features include a flying service equipment anchoring means (anchoring points) 20, an alignment means (alignment fiducials) 22, a contactless transceiver 26, a detector lock/release mechanism 28, and a proximity contactless antenna 30. In addition, the service base 100 includes a signaling line circuit connection block 32, a signaling line circuit isolator and measurements feature 34, and a panel interface 36.

The service system also includes a drone and a payload carried by the drone. The drone carries the service payload, and attaches the service payload to the service base 100. The service payload attaches and anchors to the service base 100 via the anchoring points 20 of the service base 100. In the illustrated example, these anchoring points 20 are provided around the periphery of the service base 100, at 0, 120, and 240 degrees with respect to the center of the base 100. Three anchoring points 20 are shown.

The alignment fiducials 22 are located at three points of the service base 100 at 60, 180, and 300 degrees with respect to its center. These alignment fiducials 22 include patterns such as optical patterns 24. The optical patterns 24 are detected by optical detectors of the drone and/or service payload, when the drone approaches the service base 100.

The optical detectors of the drone or service payload use the optical patterns 24 of the alignment fiducials 22 to align the drone/service payload to the base 100 and its anchor points 20. In this way, the alignment fiducials 22 guide the drone and/or service payload, during a self-approach of the drone and its service payload upon the base 100.

The contactless transceiver 26 is included in the service base 100. The contactless transceiver 26 allows the service payload to establish communications with the smart detector base 100.

When the distributed devices are fire detection devices, the panel interface 36 provides a connection between the service base 100 and a signaling line circuit of the fire alarm system. A fire alarm control panel of the fire alarm system also connects to the signaling line circuit.

In one example, when the service payload 230 is attached to the service base 100, a metal contact or pad 32-1 (FIG. 4) of the service payload 230 makes a direct electrical connection to the signaling line circuit by making mechanical contact with the signaling line circuit connection block 32. In this way, the service payload can verify the integrity of the signaling line circuit and even execute communications handshakes with the control panel via the signaling line circuit for testing the control panel.

The proximity contactless antenna 30 is also included in the base 100 and establishes wireless data communications between the service base 100 and the drone and/or service payload.

In one example, the detector lock release mechanism 28 is activated by a mechanical finger actuator on the service payload in order to attach and release a fire detection device from the service base 100.

FIG. 2 shows more detail for the drone 200 and its service payload 230. The drone 200 attaches its service payload 230 to the service base 100 of a distributed device such as a fire detection device, and detaches the service payload 230 from the drone 200.

In one example, the service payload 230 includes detector service tools 232. One example of these tools 232 is a jig for holding a fire detection device and then moving that fire detection device into contact with the service base 100, once the service payload 230 is anchored to the base 100. In another example, the detector service tools 232 include a hood 216, a cleaning tool and a smoke generator. Specifically, this hood is placed over the fire detection device. Then, the smoke generator generates smoke or smoke equivalent to test operation of the fire detection device 220. Then, if the device 220 is determined to be dirty, the clean tool cleans the fire detection device 220.

The service payload 230 also includes optical detectors such as self-approaching sensors 218. The sensors 218 are used by the service payload 230 to detect the alignment fiducials 22 of the service base 100 to allow the drone 200 to automatically connect to the detector base 100. In examples, the sensors 218 might be visual, infrared, or radio sensors.

The service payload 230 further includes a number of other components. For example, the service payload 230 includes a data logger 234 for activity reporting. The service payload 230 also includes detector base anchoring tools 236 for connecting the payload 230 to the anchor points 20 of the service base 100. The service payload 230 also includes a payload contactless transceiver 238 to make a proximity data communication path with the contactless transceiver 26 of the service base 100.

Further, both the drone 200 and service payload 230 have separate radio remote control transceivers for providing communications with an equipment remote controller. A payload remote control transceiver 252 and a drone remote control transceiver 262 are shown.

Also, as is common to drones 200, its propellers are powered by a drone battery pack 248. In one embodiment, there are at least two battery packs, a payload battery pack 244 for the service payload and the drone battery pack 248 for the drone 200. In the illustrated example, an airbag 246 is also provided on the bottom of the drone 200 in case the drone loses power and must make an alert emergency landing.

Also, a service payload attach/detach mechanism 250 is provided between the service payload 230 and the drone 200, possibly as part of the payload battery pack 244. This allows the drone 200 to attach and detach from the service payload 230.

The payload remote control transceiver 252 and drone remote control transceiver 262 respectively provide wireless control data paths 62-1 and 62-2 to an equipment remote controller. More detail for the equipment remote controller and the control data paths 62 accompany the description of FIG. 3, included herein below.

The drone 200 can also retrieve/remove service payload 230 that was previously attached to the base 100 (by the drone 200 or manually by an operator, in examples). Here, the drone 200 approaches and lands upon the base 100. Via its anchoring tools 236, in one example, the drone 200 attaches to the service payload 230, and then detaches the service payload 230 from the base 100. In this way, the drone 200 can reuse the service payload 230 at another fire detection device 220, or return the service payload 230 to an operator.

FIG. 3 shows more detail for the flying service equipment radio remote controller (equipment remote controller 50). The equipment remote controller 50 includes a drone remote controller 52 portion and a payload remote controller 54 portion.

The equipment remote controller 50 has antenna 60-1 and 60-2. Antenna 60-1 provides a wireless (e.g. radio frequency) control data path 62-1 to the drone 220 for controlling its flight. Antenna 60-2 provides wireless control data path 62-2 to control the service payload 230 and its detector service tools 232.

The drone remote controller 52 includes two flight controllers: a throttle/steering stick 64 and a forward/backward/left/right stick 66 for remote control of the drone 200.

In other embodiments, however, the drone 200 works autonomously or semi autonomously.

The payload remote controller 54 has various control buttons 68, 70 that enable control of the service payload 230 and its detector service tools 232, respectively.

In one example, as shown, the equipment remote controller 50 is implemented using dedicated hardware and components. In another example, the equipment remote controller 50 comprises a hardware "dongle" that attaches to user devices such as mobile phones and tablet devices, and an application executing on the user devices. The dongle enables wireless communications between the user devices and the drone, and the app controls the communications.

On approach to a fire detection device, in one example, the drone and the service payload and the service base 100 will establish optical or RF wireless control data paths 62 with the equipment remote controller 50. These control data paths 62 allow the operator to communicate with all components involved in the planned activity.

Figure 4:
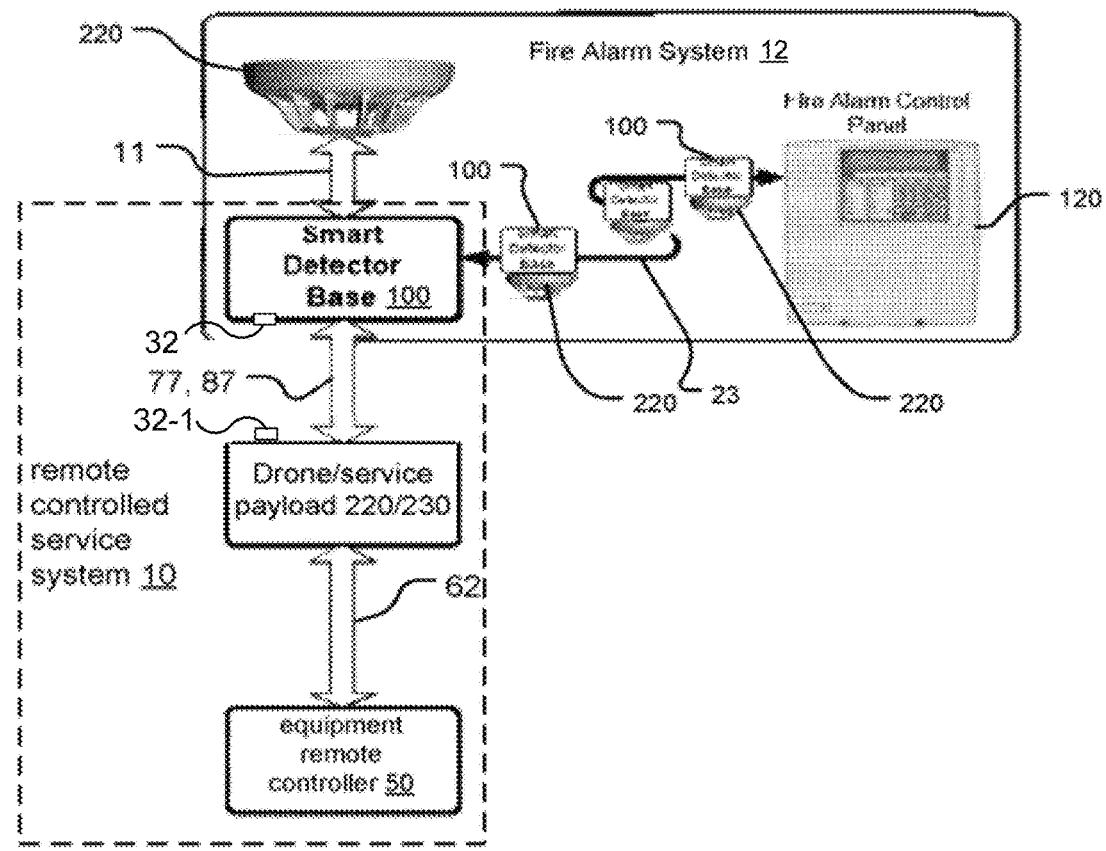
FIG. 4 schematically illustrates service system being used to service fire detection devices in a fire detection system, and where data links between components of the service system and the fire detection system are also shown.
Figure 4:
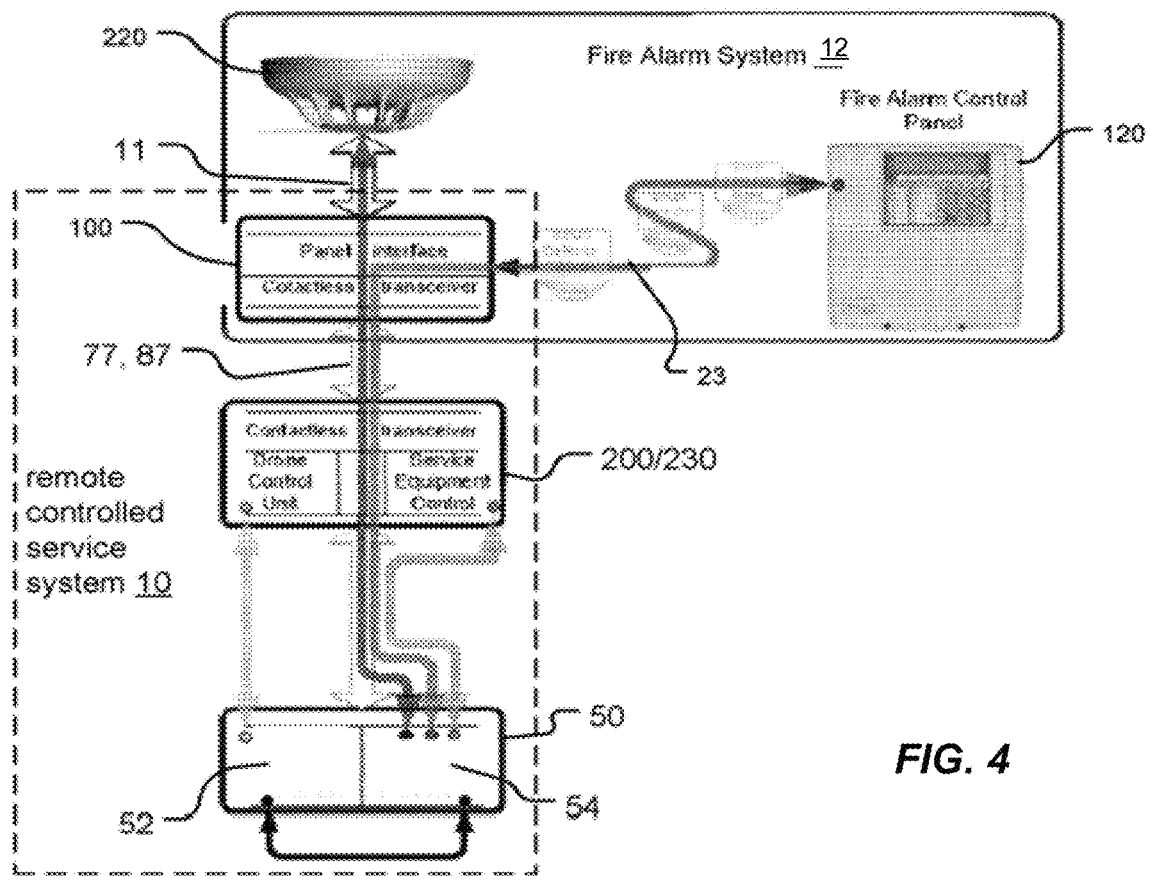

FIG. 4 schematically illustrates various data links between components of the service system 10 and a fire alarm system 12, when the service system 10 is being used to service fire detection devices 220 in the fire alarm system 12.

The fire alarm system 12 includes fire detection devices 220. A service base 100 of the service system 10 is attached to each fire detection device 220. The fire alarm system also includes a fire alarm control panel 120 as an example of a control panel, which also connects to a signaling line circuit 23. The smart bases 100 also connect the fire detection devices 220 to the signaling line circuit 23.

Electrical and mechanical connections 11 between the base 100 and a fire detection device 220 are indicated. Data links between the equipment remote controller 50 and the drone/service payload 200/230, between the drone/service payload and the base/fire detection device 100/220 and possibly between the signaling line circuit 23 and control panel 120 are also shown.

In more detail, the figure shows how the drone/service payload 200/230 can access the Signaling Line Circuit 23 and thus the control panel 120, via proximity data link 77 and/or mechanical link 87. The proximity data link 77 is established between the proximity contactless transceiver 26 of the base 100 and the payload contactless transceiver 238 of the service payload 230. The mechanical link 87 is formed when the metal contact or pad 32-1 of the service payload 230 makes physical contact with the signaling line circuit connection block 32 of the base 100.

Note that such communication does not require extra infrastructures to work, allowing to exchange data also when the communication infrastructure in the site is still not working or present at all. This autonomous capability is suitable during the Fire System installation phase where it is common to work having the other technological systems in the site not fully operative.

The service base 100, as well as supporting and connecting the fire detection devices 220 to the Signaling Line Circuit 23, supplies all the means to allow the drone to perform autonomous and safe standing and approach/detach maneuvers without the need of any "third party" positioning system. The service base 100 also implements the required data packets switch activity to implement all the required data paths.

In the design of the service base 100, the key parameter is the cost. Because a great number of fire detection devices 220 will be mounted on this base 100 for maintenance, its cost may significantly affect the entire system cost.

The self-approaching sensors 218 are typically passive or relatively inexpensive infrared beacons. Also, the service payload 230 anchoring mechanism should be passive, such as being recesses all around the base 100, in order to allow the anchoring with different orientation and to not require power to keep the service payload 230 anchored to the base 100.

As for the Proximity Radio Link 77, the candidate technology is the Near Field Communication (NFC) allowing implementation in an inexpensive way, bidirectional data path (using dual port, tag and antenna on Printed Circuit Board) having a sufficient bandwidth for the purpose. The use of the Proximity Radio Link 77 allows for not being so accurate in the service payload anchoring, because no electrical connectors need to be paired. The design of the electronics of the service 100 have to be approached in a modular way in order to remove (not to populate) functions that the customer does not require.

The drone 200 that carries the service payload 230 includes all the means to execute the activities such as automatic service base 100 approach/detach maneuver, the set of tools to execute the expected activities and all means to implement the required data paths using the appropriate transmission technologies. A devoted rechargeable electrical power source will supply all the power required by the service payload 230.

In the design of the drone 200 and the service payload 230, the weight and battery storage capacity are the key parameters. The use of "cartridges" to generate smoke instead of pressurized cans to test smoke and CO detectors greatly reduces the overall test set weight. In addition, the evolution in the rechargeable batteries technologies helps to reach the goal of being lightweight. The mechanical design of the Drone 200 and the service payload 230 should supply means to quickly fix and remove different types of payload and a fast battery pack replacement capability.

Figure 5:
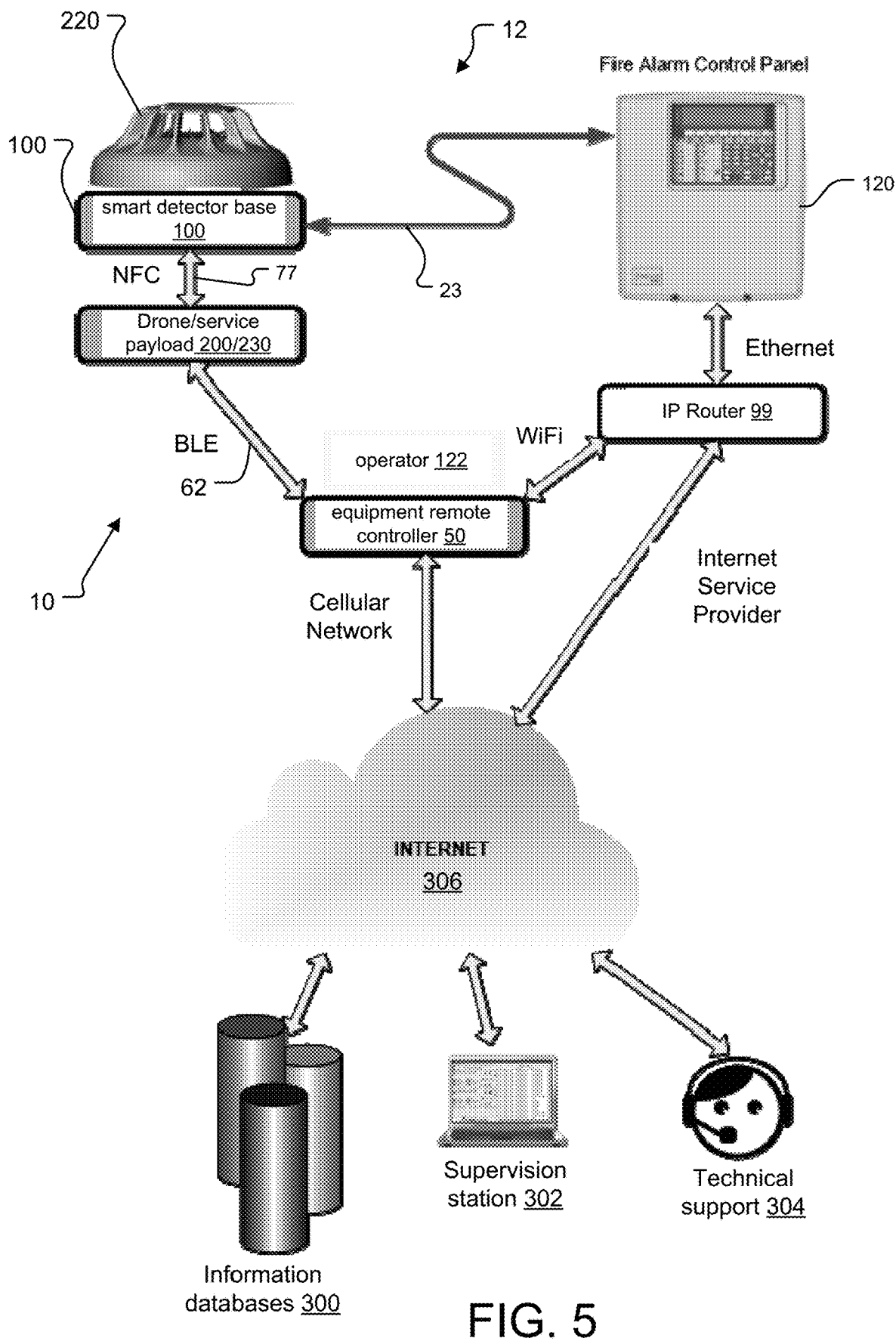
FIG. 5 shows different data paths between components of the service system, when the service system is used to service fire detection devices in a fire alarm system also having a fire alarm control panel, remote databases, supervision systems, and technical support.

The equipment remote controller 50 will allow the complete control of the Drone 200 and its service payload 230 plus the communication over the expected data paths as shown in FIG. 5.

In examples, the proximity radio link 77 uses NFC. The control data paths 62 use Bluetooth Low Energy (BLE) links. The fire alarm control panel 120 connects to an IP router 99 via an Ethernet connection. The IP router 99, in turn, connects to the equipment Remote Controller 50 via WiFi.

The equipment Remote Controller 50 connects to the internet 306 via a cellular link, and the IP router 99 connects to the internet 306 via an internet service provider network. Then, the internet 306 enables connection to information databases 300, a supervision station 302, and technical support 304.

The idea is that the equipment Remote Controller 50 has two main functional blocks: a block that controls the Drone flying (e.g. the drone remote controller 52 portion) and a block that controls the Payload activity (e.g. the payload remote controller 54 portion). These blocks may use devoted hardware or share the same hardware. Examples of applications running on mobile devices, like a Tablet PC, to control flying of the drone 200 are also possible. Considering also the huge increase in computational power of professional Tablet PCs, it is reasonable to imagine that all the control functions may be integrated in a single application.

The use of a Tablet PC having Wireless communication capability (like WIFI and/or connection to Cellular Network) will allow getting almost infinite information from WEB services, creating a fully integrated environment.

Using the service system 10, the drone operator 122 will have the possibility to reach all parts involved in the activity he is executing. He will have the available full set of information, ranging from basic electrical values up to high level and contents rich information like plant maps, test report registers, operation instructions, interactive technical support and so on. All of them will be tailored for the specific object and activity selected and supplied using the most effective media like, readable documents, audio files or videos.

This superior communication ability of the service system 10 is particularly useful during maintenance and system troubleshooting, supplying to the operator 122 the maximum possible support during critical situation as shown in FIG. 5. Normally the involved persons extremely appreciate aspects like this. In this way, access to a supervision station 302, technical support 304 and information databases 300 is provided via the internet 306 local wireless networks and cellular data links.

Figure 6:
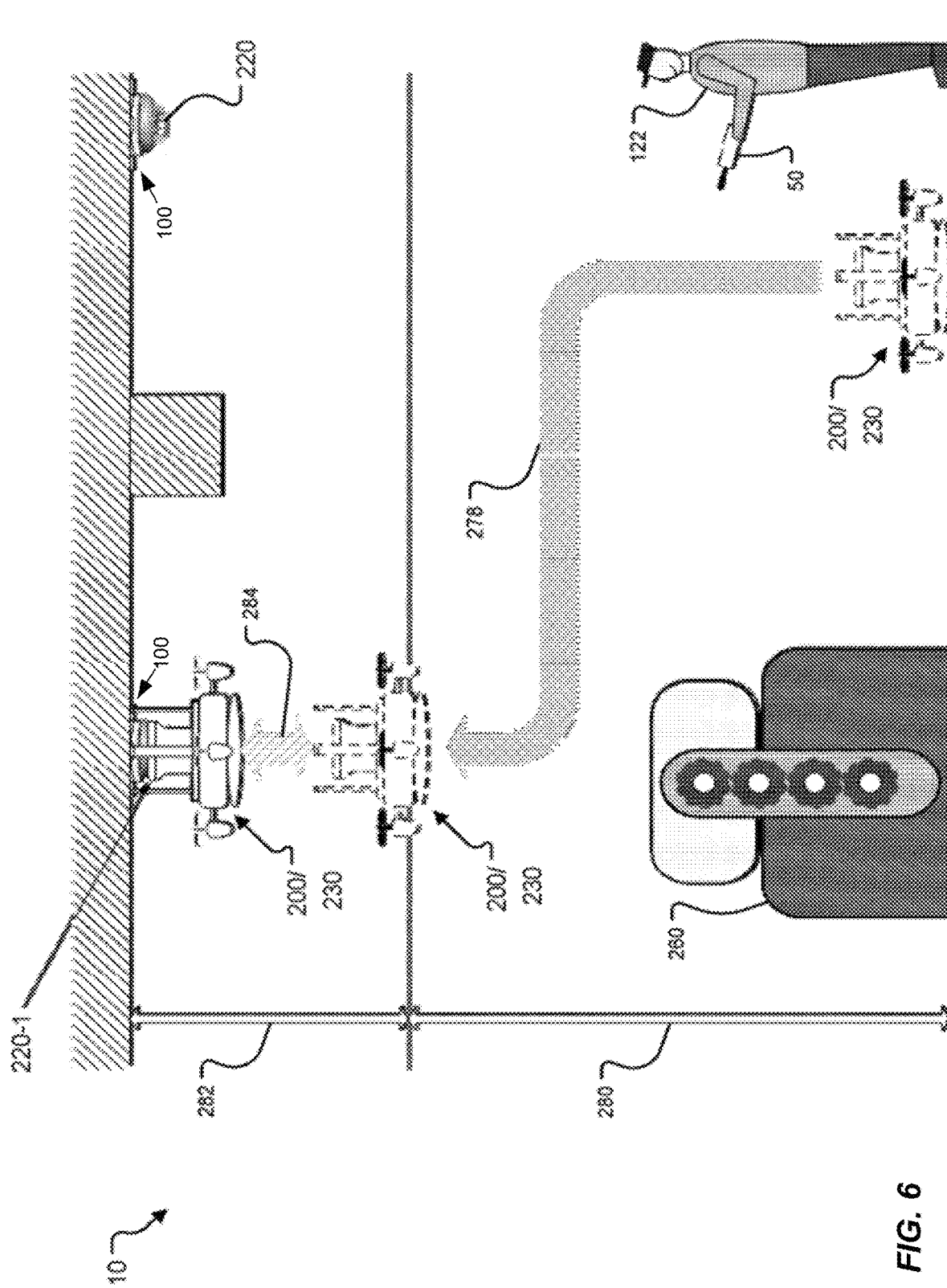
FIG. 6 is a schematic diagram showing how the service system can be used to service even hard to reach/nearly inaccessible fire detection devices, such as devices located above machinery.

Finally, FIG. 6 illustrates how the service system 10 can be used to install or otherwise perform service activities upon fire detection devices 220 in locations which are difficult or possibly dangerous for operators to otherwise reach or access.

In the illustrated example, operator 122 is shown, testing and configuring fire detection device 220-1 using the drone 200. The fire detection device 220-1 is located above machinery 260 that presents both an obstacle and a hazard to the operator 122.

Via the equipment remote controller 50, the operator can direct the drone 200 to be upon the fire detection device 220-1. At the same time, the operator is located at a safe distance from the machinery 260, in a comfortable and well-supported environment. As illustrated in FIG. 6, even hard to access fire detection devices 220, such as device 220-1 located above machinery 260 can be safely and remotely installed, tested and serviced.

For this purpose, the operator 122 typically uses the equipment remote controller 50 to manually pilot the drone/service payload 200/230 to a manually piloted height 280, along a manual flight path 278. Typically, the manually piloted height 280 is at a point within a few feet of the base 100.

Once the drone 200 reaches the manually piloted height 280, the drone 200 can enter its "self-approaching" mode in different ways. In one example, once the drone 200 has reached the manually piloted height 280, the drone 200 can send a corresponding signal to the drone remote controller 52. When the operator 122 sees the signal on the drone remote controller 52, the operator 122 directs the drone 200 to enter self-approaching mode. In another example, the drone 200 itself can gauge its distance from the detector base 100 after reaching the manually piloted height 280, and enter self-approaching mode without requiring additional instruction from the operator/drone remote controller 122/52.

The drone 200 will then automatically approach the base 100, and attach its service payload 230 to the base 100. The distance from the manually piloted height 280 to the detector base 100/fire detection device 220 is indicated in the figure as a self-approaching and detachment flight height 282, and a self-approaching and detachment flight path 284 is also indicated in the figure. In this way, the service payload 230 and its service tools 232 are placed upon the fire detection device 220.

The operator 122 can also manually override/abort the automated self-approach.

The drone 200 is then available to approach other fire detection devices 220 and provide service payload(s) 230 to other fire detection devices 220.

CONCLUSIONS

The solution presented has the main goal of solving operator safety issues related to the installation, maintenance and testing of fire detection devices. Furthermore, we discovered that the approach used to reach the main goal (detectors testing, replacement, etc.) may also add value to each and every activity of the process making them more effective with significant benefits on the entire Fire System.

The ability to create communication paths allows implementing a well-integrated environment giving to the installer a complete overview of the system and makes it ready to face future challenges.

A good balancing of features between the Smart Detector Base 100 and the drone/service payload 200/230 will make it possible to supply all the previously described superior functionalities with a negligible and non-recursive service system 10 of extra-cost related to the use of the Smart Detector Bases.

Evolution

The final scenario to aim for, will be the one in which a fleet of drone/service payloads will move all over the protected building and under the control of the building supervision system will continuously take care of the Fire Detection and Protection system.

This scenario will guarantee a significant reduction of the system "out of service" periods thanks to the quick intervention at any time and continuous care that prevents some critical situation, as, for example, the dirty smoke detectors condition.

Extending the vision beyond the fire detection and protection system needed, the proposed approach may be conveniently used in other systems inside a building, like ventilation and air conditioning and internee of things (IoT) sensors located around buildings.

Drones equipped with appropriate tools and sensors, as payload, may approach air vents and execute measurement of significant air parameters (flow speed, temperature, air quality and so on) and/or execute basic actions like inspecting, cleaning and/or controlling the air flow.

The capability of the Drone's payload to implement data path via short/medium range radio links up to reaching the Internet "cloud" may add to a purely mechanical item as the air vent through the IoT capability, allowing the remote supervision and control of the object when required (i.e., a type of "IoT on demand").

It can also be appreciated that the service system 10 can be used to service other hard to reach/nearly inaccessible distributed devices other than fire detection devices.

While this invention has been particularly shown and described with references to preferred embodiments thereof, it will be understood by those skilled in the art that various changes in form and details may be made therein without departing from the scope of the invention encompassed by the appended claims.

What is claimed is:

1. A service system for distributed fire detection devices of a building management system of a building, comprising:
a drone; and
a service payload carried by the drone for performing a fire detection test on a fire detection device within the distributed fire detection devices,
wherein the fire detection device is mounted to a surface in the building and is operable to detect an indicator of a fire in the building,
wherein the drone is controllable to attach the service payload to a service base of the fire detection device,
wherein, subsequent to attaching the service payload to the service base of the fire detection device, the drone is controllable to detach the service payload from the drone,
wherein, subsequent to attaching the service payload to the service base of the fire detection device and detaching the service payload from the drone, the service payload is controllable to perform the fire detection test on the fire detection device.

2. The service system of claim 1, further comprising an equipment remote controller for controlling the drone and the service payload.

3. The service system of claim 1, wherein the service payload includes service tools for performing the fire detection test on the fire detection device.

4. The service system of claim 1,
wherein the fire detection device comprises a smoke detector mounted to a ceiling in the building and operable to detect smoke, and
wherein the service payload is operable to generate smoke.

5. The service system of claim 1, wherein the service base includes alignment fiducials that enable alignment of the drone with the service base.

6. The service system of claim 5, wherein the drone includes optical detectors that detect optical patterns of the alignment fiducials to align the drone to the service base.

7. The service system of claim 1,
wherein the drone is directed to the service base for a manually piloted height, and
wherein the drone self-approaches the service base after reaching the manually piloted height.

8. The service system of claim 1, wherein the service payload includes service tools that include at least one of:
anchoring tools for connecting the service payload to anchor points of the service base; or
a cleaning tool for cleaning the fire detection device.

9. The service system of claim 1, wherein the service payload includes:
a smoke generator that generates smoke or a smoke equivalent; and
a hood that is placed upon a surface of the fire detection device and delivers the smoke or the smoke equivalent to the fire detection device.

10. The service system of claim 1, wherein, subsequent to attaching the service payload to the service base of the fire detection device and detaching the service payload from the drone, the drone is controllable to fly away while the service payload remains hooked to the service base of the fire detection device.

11. A method for performing activities on distributed fire detection devices of a building management system of a building, comprising:
carrying a service payload using a drone to a fire detection device within the distributed fire detection devices, wherein the fire detection device is mounted to a surface in the building and is operable to detect an indicator of a fire in the building;
attaching the service payload to a service base of the fire detection device by the drone;
detaching the service payload from the drone subsequent to attaching the service payload to the service base of the fire detection device; and
performing a fire detection test on the fire detection device by the service payload subsequent to attaching the service payload to the service base of the fire detection device and detaching the service payload from the drone.

12. The method of claim 11, further comprising using an equipment remote controller for controlling the drone and the service payload.

13. The method of claim 11, wherein the service payload includes service tools for performing the fire detection test on the fire detection device.

14. The method of claim 11,
wherein the fire detection device comprises a smoke detector mounted to a ceiling in the building and operable to detect smoke, and
wherein the service payload is operable to generate smoke.

15. The method of claim 11, wherein the service base includes alignment fiducials that enable alignment of the drone with the service base.

16. The method of claim 15, further comprising using optical detectors to detect patterns of the alignment fiducials to align the drone to the service base.

17. The method of claim 11,
wherein the drone is directed to the service base for a manually piloted height, and
wherein the drone self-approaches the service base after reaching the manually piloted height.

18. The method of claim 11, wherein the service payload includes service tools that include at least one of:
anchoring tools for connecting the service payload to anchor points of the service base; or
a cleaning tool for cleaning the fire detection device.

19. The method of claim 11, wherein the service payload includes:
a smoke generator that generates smoke or a smoke equivalent; and
a hood that is placed upon a surface of the fire detection device and delivers the smoke or the smoke equivalent to the fire detection device.

20. The method of claim 11, further comprising:
flying the drone away, subsequent to attaching the service payload to the service base of the fire detection device and detaching the service payload from the drone, while the service payload remains hooked to the service base of the fire detection device.

* * * * *